(12) United States Patent
Patel et al.

(10) Patent No.: US 9,525,851 B2
(45) Date of Patent: Dec. 20, 2016

(54) SYSTEM AND METHOD FOR SHARING DIGITAL IMAGES OVER A CONTENT-BASED NETWORK

(75) Inventors: Vipul Patel, Upper Holland, PA (US); Scott Miller, Sweet Briar, VA (US); Mehul Shah, Horsham, PA (US); David Chen, Jamison, PA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 1076 days.

(21) Appl. No.: 12/179,650

(22) Filed: Jul. 25, 2008

(65) Prior Publication Data
US 2010/0023979 A1   Jan. 28, 2010

(51) Int. Cl.
| | |
|---|---|
| H04N 7/173 | (2011.01) |
| H04N 5/445 | (2011.01) |
| G06F 3/00 | (2006.01) |
| G06F 13/00 | (2006.01) |
| H04N 1/00 | (2006.01) |
| H04N 21/2343 | (2011.01) |
| H04N 21/254 | (2011.01) |

(Continued)

(52) U.S. Cl.
CPC ...... *H04N 7/17318* (2013.01); *H04N 1/00098* (2013.01); *H04N 1/00132* (2013.01); *H04N 1/00137* (2013.01); *H04N 1/00151* (2013.01); *H04N 21/234336* (2013.01); *H04N 21/254* (2013.01); *H04N 21/2743* (2013.01); *H04N 21/472* (2013.01); *H04N 21/8153* (2013.01); *H04N 21/8455* (2013.01); *H04N 2201/0068* (2013.01)

(58) Field of Classification Search
None
See application file for complete search history.

(56) References Cited

U.S. PATENT DOCUMENTS

| | | |
|---|---|---|
| 6,871,236 B2 | 3/2005 | Fishman et al. |
| 7,266,726 B1 | 9/2007 | Ladd et al. |
| | (Continued) | |

OTHER PUBLICATIONS http://techterms.com/definition/server.*
(Continued)

*Primary Examiner* — Nasser Goodarzi
*Assistant Examiner* — Fred Peng
(74) *Attorney, Agent, or Firm* — Otterstedt, Ellenbogen & Kammer, LLP

(57) ABSTRACT

A head end application server is coupled to a photo-sharing server having an Internet interface. A video content network is coupled to the head end application server, and a terminal is coupled to the video content network at a location remote from the head end application server and the photo-sharing server. The photo-sharing server is configured to accept upload of digital still images via the Internet interface, and the digital still images are in a format other than MPEG I-frames. The head end application server is configured to receive a request from the terminal and, responsive to the request, to fetch the digital still images from the photo-sharing server, transcode the digital still images into MPEG I-frames, and make the MPEG I-frames available, over the video content network, for selective display via the terminal. The system can advantageously function without use of a video-on-demand server.

22 Claims, 8 Drawing Sheets

(51) Int. Cl.
*H04N 21/2743* (2011.01)
*H04N 21/472* (2011.01)
*H04N 21/81* (2011.01)
*H04N 21/845* (2011.01)

(56) References Cited

U.S. PATENT DOCUMENTS

| | | | |
|---|---|---|---|
| 7,379,498 B2 * | 5/2008 | Fu et al. | 375/240.12 |
| 2002/0156863 A1 | 10/2002 | Peng | |
| 2003/0056217 A1 | 3/2003 | Brooks | |
| 2004/0031052 A1 * | 2/2004 | Wannamaker et al. | 725/61 |
| 2004/0117837 A1 | 6/2004 | Karaoguz et al. | |
| 2005/0114900 A1 | 5/2005 | Ladd et al. | |
| 2005/0160452 A1 * | 7/2005 | Lawler | H04N 5/44543 725/38 |
| 2005/0210145 A1 * | 9/2005 | Kim | G06F 17/30849 709/231 |
| 2006/0020786 A1 | 1/2006 | Helms et al. | |
| 2006/0020950 A1 | 1/2006 | Ladd et al. | |
| 2006/0026655 A1 | 2/2006 | Perez | |
| 2006/0047957 A1 | 3/2006 | Helms et al. | |
| 2006/0050784 A1 * | 3/2006 | Lappalainen et al. | 375/240.03 |
| 2006/0053456 A1 | 3/2006 | Kelly | |
| 2006/0130107 A1 | 6/2006 | Gonder et al. | |
| 2006/0130111 A1 * | 6/2006 | Reitmeier | H04H 20/103 725/112 |
| 2006/0130113 A1 | 6/2006 | Carlucci et al. | |
| 2006/0218604 A1 | 9/2006 | Riedl et al. | |
| 2007/0094691 A1 | 4/2007 | Gazdzinski | |
| 2007/0153820 A1 | 7/2007 | Gould | |
| 2007/0204314 A1 | 8/2007 | Hasek et al. | |
| 2007/0217436 A1 | 9/2007 | Markley et al. | |
| 2008/0086752 A1 * | 4/2008 | Perez | 725/87 |
| 2009/0150517 A1 * | 6/2009 | Atsmon | H04L 67/06 709/217 |

OTHER PUBLICATIONS https://en.wikipedia.org/wiki/Web_hosting_service.*
Kodak EasyShare—Wikipedia, http://en.wikipedia.org/wiki/Kodak_Easyshare.
Kodak EasyShare—http://www.kodak.com/eknec/PageQuerier.jhtml?pq-path=130&CID=go&idhbx=easyshares&pq-locale=en.
Kodakgallery.com About the Company, http://www.kodakgallery.com/AboutUs.jsp?UV=697856655476_14488361813.
U.S. Appl. No. 11/378,129, filed Mar. 16, 2006 and titled "Method and Apparatus for Centralized Content and Data Delivery".
U.S. Appl. No. 10/773,664, filed Feb. 6, 2004, titled, "Methods and Apparatus for Display Element Management in an Information Network".
U.S. Appl. No. 12/055,388, filed Mar. 26, 2008, titled, "System and Method for Content Sharing".

* cited by examiner

SYSTEM AND METHOD FOR SHARING DIGITAL IMAGES OVER A CONTENT-BASED NETWORK

FIELD OF THE INVENTION

The present invention relates generally to communications systems and methods, and, more particularly, to content-sharing techniques.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

In accordance with the MPEG-2 standard, video data may be compressed based on a sequence of groups of pictures (GOPs), made up of three types of picture frames, namely, intra-coded picture frames ("I-frames"), forward predictive frames ("P-frames"), and bilinear frames ("B-frames"). Each GOP may, for example, begin with an I-frame which is obtained by spatially compressing a complete picture using discrete cosine transformation (DCT). As a result, if a transmission error or a channel switch occurs, it is possible to resume correct decoding at the next I-frame. The GOP may represent additional frames by providing a much smaller block of digital data that indicates how small portions of the I-frame, referred to as macroblocks, move over time.

An I-frame is typically followed by multiple P- and B-frames in a GOP. Thus, for example, a P-frame occurs more frequently than an I-frame by a ratio of about 3 to 1. A P-frame is forward predictive and is encoded from the I- or P-frame that precedes it. A P-frame contains the difference between a current frame and the previous I- or P-frame. A B-frame compares both the preceding and the subsequent I- or P-frame data. The B-frame contains the average of matching macroblocks or motion vectors. Because a B-frame is encoded based upon both preceding and subsequent frame data, it effectively stores motion information.

Thus, MPEG-2 achieves its compression by assuming that only small portions of an image change over time, allowing the representation of these additional frames to be quite compact. Although GOPs have no relationship between themselves, the frames within a GOP have a specific relationship which builds off the initial I-frame.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

Video on demand (VOD) systems allow users to select and watch video content over a network. Some VOD systems "stream" content for real-time viewing. Others "download" the content to a set-top box before viewing starts. Use of digital video recorders (DVRs), also known as personal video recorders (PVRs), such as the TiVo® device (registered mark of TiVo Brands LLC, Alviso, Calif.) and the R Replay TV® device (registered mark of Digital Networks North America Inc., Pine Brook, N.J.), is ubiquitous. Such devices may provide some benefits to TV viewers. For example, a prior art DVR allows a user to record his or her favorite TV programs for later review, and to exercise a season-pass-like option wherein every episode of his or her favorite program is recorded for some period. Such devices may automatically record programs for the user based on his or her viewing habits and preferences. The presentation of the recorded programming content can be manipulated by exercising rewind, pause, skip and/or fast-forward functions (hereinafter referred to as "trick mode" or "trick play" functions) furnished by the DVR.

A "network PVR (NPVR)" (also referred to as an NDVR (Network Digital Video Recorder)) service allows the user to perform the analogous DVR functions through use of a network, rather than via a local DVR at the user premises. Unlike a DVR device, the NPVR service allows a user to "reserve" past and future programs for his or her review, even if such reserved programs were not identified by the user before their broadcast. Note that an NDVR can be distinguished from a DVR in that the latter, storage of programs and the like is local to the DVR, while in the former (NDVR) case, such storage is at the server or head end level.

United States Patent Application Publication Number 2006-0053456 of Brian E. Kelly, the complete disclosure of which is expressly incorporated herein by reference in its entirety for all purposes, discloses a technique for delivering, through a communications network, content of entertainment programs, and video recordings provided by users. In particular, a user may utilize a "home video on demand (HVOD)" service to distribute a video recorded using, e.g., a conventional camcorder, to desired viewers who have access to a broadband communications network, e.g., a cable TV network. The inventive system providing the HVOD service may receive from the user the video recording via email, postal mail, the Internet, computer transfer, etc. The inventive system converts the received video recording from its original video format to a uniform format. e.g., an MPEG-2 format. The converted video recording is stored in storage and made available to authorized viewers through the cable TV network.

United States Patent Application Publication Number 2004-0117837 of Jeyhan Karaoguz discloses a system and methods for communicating activity information to support user interaction during media broadcasts in a media exchange network. In an embodiment, a first user may associate a second user with particular media characteristics. Media characteristics may comprise, for example, subject and title keywords, a media channel type, a mode, a genre, an artist, a time period, and a language. The second user may be notified when the first user consumes media having pre-defined characteristics matching those associated with the second user. The second user may keep records of the consumption of media with particular media characteristics, and may provide services or incentives to the first user. A system may comprise a first and a second set top box, each having storage with an associated network address. A user of the second set top box may have at least one associated media characteristic, and the second user may be sent a notification when the first user requests media with pre-defined characteristics matching the media characteristic associated with the second user.

United States Patent Application Publication Number 2006-0026655 of Milton D. Perez discloses a system and method for managing, converting and displaying video content on a video-on-demand platform, including ads used for drill-down navigation and consumer-generated classified ads. A video-on-demand (VOD) content delivery system has a VOD Application Server which manages a database of templates ordered in a hierarchy for presentation of video content elements of different selected types categorized in hierarchical order. The templates include those for higher-order displays which have one or more links to lower-order displays of specific content. The VOD Application Server, in response to viewer request, displays a high-order templatized display, and in response to viewer selection of a link, displays the lower-order display of specific content. The hierarchical templatized displays enable viewers to navigate to an end subject of interest while having a unique visual experience of moving through a series of displays to the end subject of interest. For example, the higher-order display may be a product ad and the lower-order display may be an ad for a local retailer of the product. Similarly, a viewer can navigate from national product to local product ad, or classified ad category to specific classified ad, or bulletin board topic category to specific posting. In another embodiment, the VOD content delivery system is used to deliver consumer-generated classified ads on TV. A web-based Content Management System receives consumer-generated content uploaded online in industry-standard file formats with metadata for title and topical area, and automatically converts it into video data format compatible with the VOD content delivery system indexed by title and topical area. A User Interface for the system delivers listings data to the viewer's TV indexed by title and topical area, and displays a requested classified ad in response to viewer selection.

Outside the television field, there are certain photo-sharing techniques which allow people to upload photos via a web site and create their own shared folders, such that other people may view the shared photos over the Internet. There are also some software packages that convert photos and stream them over a video content network like a VOD file (that is, a video stream of a non-changing still image is transported, with all the associated bandwidth requirements). Where it is desired to view an album of photos, this type of software forms a single video from the album of photos, and adding new photos requires regenerating the entire video.

SUMMARY OF THE INVENTION

Principles of the present invention provide techniques for sharing digital images over a content-based network. In one aspect, an exemplary embodiment of a video content system includes a head end application server and a photo-sharing server, coupled to the head end application server, and having an Internet interface. Also included are a video content network coupled to the head end application server; and a terminal coupled to the video content network at a location remote from the head end application server and the photo-sharing server. The photo-sharing server is configured to accept upload of digital still images via the Internet interface, and the digital still images are in a format other than MPEG I-frames. The head end application server is configured to receive a request from the terminal and, responsive to the request, to fetch the digital still images from the photo-sharing server, transcode the digital still images into MPEG I-frames, and make the MPEG I-frames available, over the video content network, for selective display via the terminal. The system can advantageously function without use of a video-on-demand server.

In another aspect, a video content system is similar to the kind just described, but does not include the photo-sharing server; instead, such server is external to the system but the system is configured to remotely interface with it.

In still another aspect, an exemplary method includes the step of receiving, at a head end application server, a request from a remote terminal. The request is received over a video content network. Another step includes fetching digital still images from a photo-sharing server. The digital still images are in a format other than MPEG I-frames. Additional steps include transcoding the digital still images into MPEG I-frames, and, responsive to the request, making the MPEG I-frames available from the head end application server, over the video content network, for selective display via the terminal. Advantageously, the method can be carried out without use of a video-on-demand server.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

An exemplary embodiment of an apparatus or system, according to still another aspect of the invention, can include a memory and at least one processor coupled to the memory. The processor can be operative to facilitate performance of one or more of the method steps described herein. Non-limiting examples of processors are those in a head end application server, a photo sharing server, a digital set-top terminal, and the like. In a further aspect, an apparatus or system can include means for performing the various method steps. The means can include one or more hardware modules, one or more software modules, or a mixture of one or more software modules and one or more hardware modules.

One or more method steps of the present invention can be implemented in the form of an article of manufacture including a machine readable medium that contains one or more programs which when executed implement such step(s).

Techniques of the present invention can provide substantial beneficial technical effects. For example, one or more embodiments may have one or more of the following advantages: reduced consumption of upstream bandwidth, faster display time, reduced memory requirements on a set-top box, and the like.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
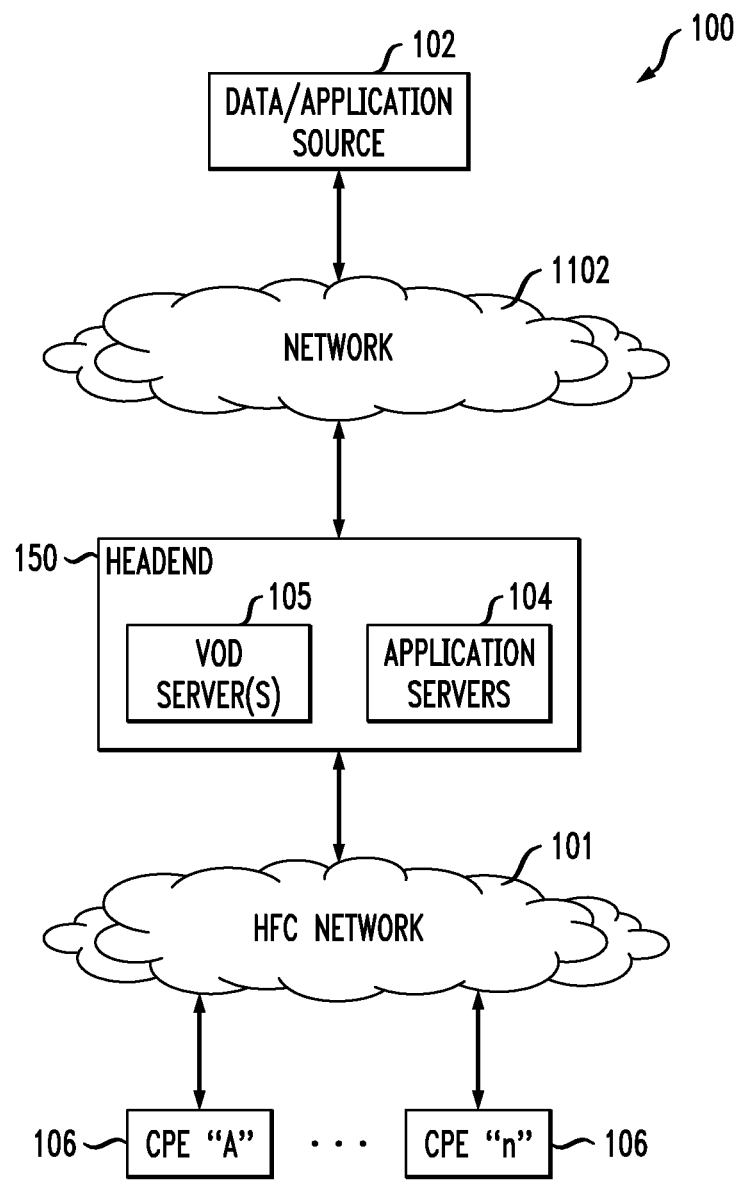
FIG. 1 is a functional block diagram illustrating an exemplary hybrid fiber-coaxial (HFC) network configuration useful with one or more embodiments of the present invention.

Initially, the complete disclosure of United States Patent Application Publication Number 2006-0130107 A1 of Gonder et al. entitled "Method and apparatus for high bandwidth data transmission in content-based networks" is expressly incorporated herein by reference in its entirety for all purposes. FIG. 1 illustrates a content-based network, which is a non-limiting example of one context within which one or more embodiments of the invention may be implemented. The various components of the network 100 include (i) one or more data and application origination points 102; (ii) one or more application distribution servers 104; (iii) one or more VOD servers 105, and (iv) customer premises equipment (CPE) 106. The distribution server(s) 104, VOD servers 105 and CPE(s) 106 are connected via a bearer (e.g., hybrid fiber-coaxial or HFC) network 101. Elements 104 and 105 may be located in a head end 150. Material from origination point 102 may be provided to head end 150 via a variety of different types of network, illustrated generally as network 11102. A simple architecture comprising one of each of the aforementioned components 102, 104, 105, (and "n" CPEs 106) is shown in FIG. 1 for simplicity, although it will be recognized that comparable architectures with multiple origination points, distribution servers, VOD servers, and/or CPE devices (as well as different network topologies) may be utilized consistent with the invention.

The application origination point 102 comprises any medium that allows an application (such as a data download application or VOD-based application) to be transferred to a distribution server 104. This can include, for example, an application vendor website, compact disk read-only memory (CD-ROM), external network interface, mass storage device (e.g., a redundant array of independent disks (RAID) system), etc. Such transference may be automatic, initiated upon the occurrence of one or more specified events (such as the receipt of a request packet or "ACK" message), performed manually, or accomplished in any number of other modes readily recognized by those of ordinary skill.

The application distribution server 104 comprises a computer system where such applications can enter the network system. Distribution servers per se are well known in the networking arts, and given the teachings herein, the skilled artisan will be able to use one or more such servers to implement one or more aspects of the invention.

The VOD server 105 is a computer system where on-demand content can be received from one or more data sources 102, and can enter the network system. These sources may generate the content and/or data locally, or alternatively act as a gateway or intermediary from a distant source. The VOD server 105 can include, for example, Session Resource Manager (SRM) functionality, and can "ask" a Digital Network Control System (DNCS) for resources. The DNCS responds with a negative or positive response to the request, and the VOD server implements the appropriate resource allocation logic.

Figure 2:
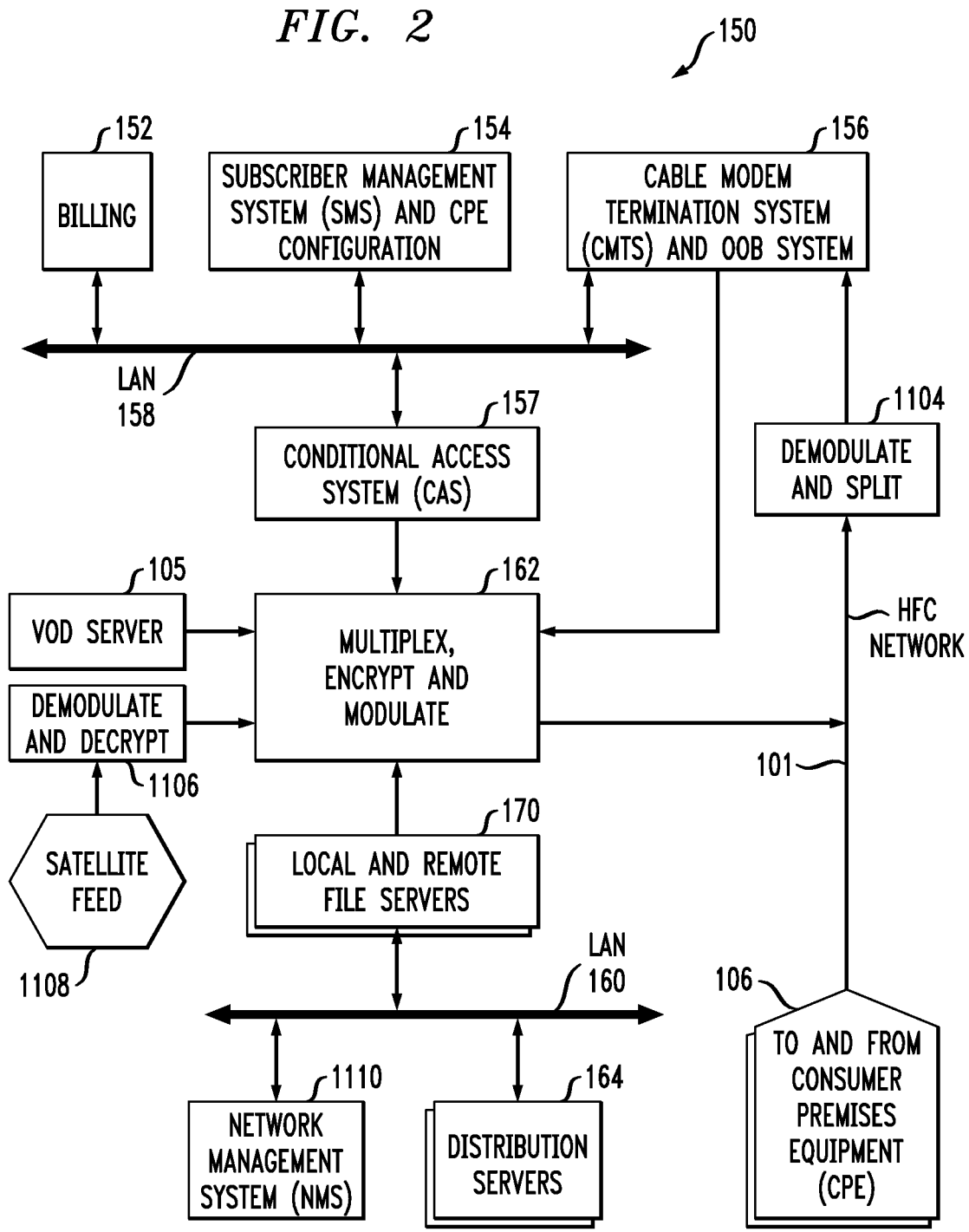
FIG. 2 is a functional block diagram illustrating one exemplary head-end configuration of the HFC network of FIG. 1.

Referring now to FIG. 2, one non-limiting exemplary embodiment of an architecture of head-end 150, useful with one or more embodiments of the present invention, is described. As shown in FIG. 2, the head-end architecture 150 comprises typical head-end components and services including billing module 152, subscriber management system (SMS) and CPE configuration management module 154, cable-modem termination system (CMTS) and out-of-band (OOB) system 156, as well as LAN(s) 158, 160, placing the various components in data communication with one another. It will be appreciated that while a bar or bus LAN topology is illustrated, any number of other arrangements (e.g., ring, star, etc.) may be used consistent with one or more embodiments of the invention. It will also be appreciated that the head-end configuration depicted in FIG. 2 is a high-level, conceptual architecture and that each cable multi-service operator (MSO) may have multiple head-ends deployed using custom architectures.

The exemplary architecture 150 of FIG. 2 further includes a multiplexer/encrypter/modulator (MEM) 162 coupled to the HFC network 101 adapted to "condition" content for transmission over the network. In the present context, the distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). Since information is carried across multiple channels, the head-end must be adapted to acquire the information for the carried channels from various sources. Typically, the channels being delivered from the head-end 150 to the CPE 106 ("downstream") are multiplexed together in the head-end and sent to neighborhood hubs (not shown). Application servers 104 are not depicted in FIG. 2, for purposes of illustrative convenience, but such servers may be located, for example, on LAN 158, or on LAN 160 (as are distribution servers 164) (in general, on a network such as an IP network in the head end 150 and/or at a regional or national level).

Content (e.g., audio, video, etc.) is provided in each downstream (in-band) channel associated with the relevant service group. In some non-limiting instances, high-speed data is also provided over in-band channels, while associated metadata files are provided either in-band or out-of-band (OOB). To communicate with the head-end, the CPE 106 uses the OOB or DOCSIS® (Data Over Cable Service Interface Specification) channels (registered mark of Cable Television Laboratories, Inc., 400 Centennial Parkway Louisville Colo. 80027, USA) and associated protocols. The OpenCable™ Application Platform (OCAP) 1.0 specification provides for networking protocols both downstream and upstream (Cable Television laboratories Inc.) Upstream communications from CPE 106 may be demodulated and split in block 1104 for communication to block 156. Note that in one or more embodiments of the invention, DOCSIS channels are not used to transfer the photos to the CPE.

In some instances, material may also be obtained from a satellite feed 1108; such material is demodulated and decrypted in block 1106 and fed to block 162. Conditional access system 157 may be provided for access control purposes. Network management system 1110 may provide appropriate management functions.

Many other permutations of the foregoing system components and communication methods may also be used consistent with the present invention, as will be recognized by those of ordinary skill in the field. For example, the network 101 may make use of switched digital technology, as known, for example, from US Patent Publication 2003-0056217 of Paul D. Brooks, entitled "Technique for Effectively Providing Program Material in a Cable Television System," the complete disclosure of which is expressly incorporated herein by reference for all purposes. The Brooks publication is a non-limiting example of switched digital techniques that may be useful.

Figure 3:
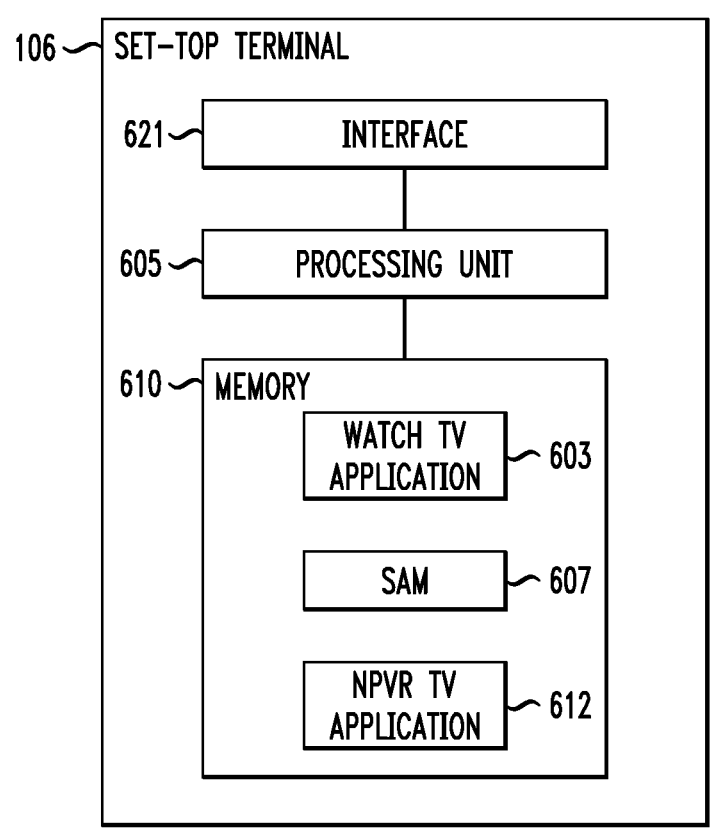
FIG. 3 presents a system block diagram of an exemplary digital set-top terminal.

FIG. 3 depicts a digital set-top terminal 106. A conventional "Watch TV" application (denoted 603 in FIG. 3) is installed in set-top terminal 106 to service those program channels (or programs) afforded a traditional broadcast service. Watch TV application 603, residing in memory 610, provides such well known functions as channel navigation control, channel selection in response to a channel change event, etc. A channel change event occurs when a user at set-top terminal 106 issues a command to change from one program channel to another. Such a command may be issued, say, using a remote control (not shown), which signal is receptive by set-top terminal 106. Memory 610 in this instance comprises one or more caches, disks, hard drives, non-volatile random access memories (NVRAMs), dynamic random access memories (DRAMs), read-only memories (ROMs), and/or Flash ROMs.

For example, in memory 610, NVRAM may be used for storage of a user's settings and set-top terminal configuration settings, such as parental control codes, favorite channel lineups, set-top terminal setups, channel maps, authorization tables, and FDC address assignments. DRAM may be used for most application and operating system storage requirements, such as stacks, heaps, graphics, interactive program guide data, marketing data and usage data, and functions such as MPEG-2 video decompression, DOLBY DIGITAL™ (registered mark of Dolby Laboratories Licensing Corporation, San Francisco, Calif.) Adaptive Transfer Coding 3 (AC-3) audio decoding, and video manipulation. ROM may be used for storage of the operating system. Flash ROM may be used for storage of resident application software, as well as patches of the operating system and application software, which software and/or patches are downloaded to set-top terminal 106 from head-end 105 after set-top terminal 106 has been deployed at the user's premises.

Processing unit 605 orchestrates the operations of set-top terminal 106. It executes instructions stored in memory 610 under the control of the operating system. Service application manager (SAM) 607 forms part of such an operating system of terminal 106. SAM 607 is responsible for, among other things, monitoring channel change events; administering channel, service and other tables in terminal 106; and maintaining a registry of applications in terminal 106. One such application is the aforementioned Watch TV application 603 which is invoked to service a traditional broadcast channel (or program). Another application is "NPVR TV" application 612 which is invoked to service NPVR enabled channels (or programs), and which may be downloaded from head-end 105 to memory 610. Application 612, among other things, responds to rewind, pause and fast-forward commands initiated by a user, and communicates such commands to head-end 105 through interface 621 to perform the trick mode (i.e., rewind, pause and fast-forward) functions on programs. Processor 605 can also be configured by memory 610 to perform (or facilitate performance of) one or more method steps as described herein. It should be noted that the elements shown in memory 610 in FIG. 3 are exemplary of various items that may or may not be found in specific terminals implementing techniques of the invention; for example, not every terminal may have NPVR TV application 612.

Figure 4:
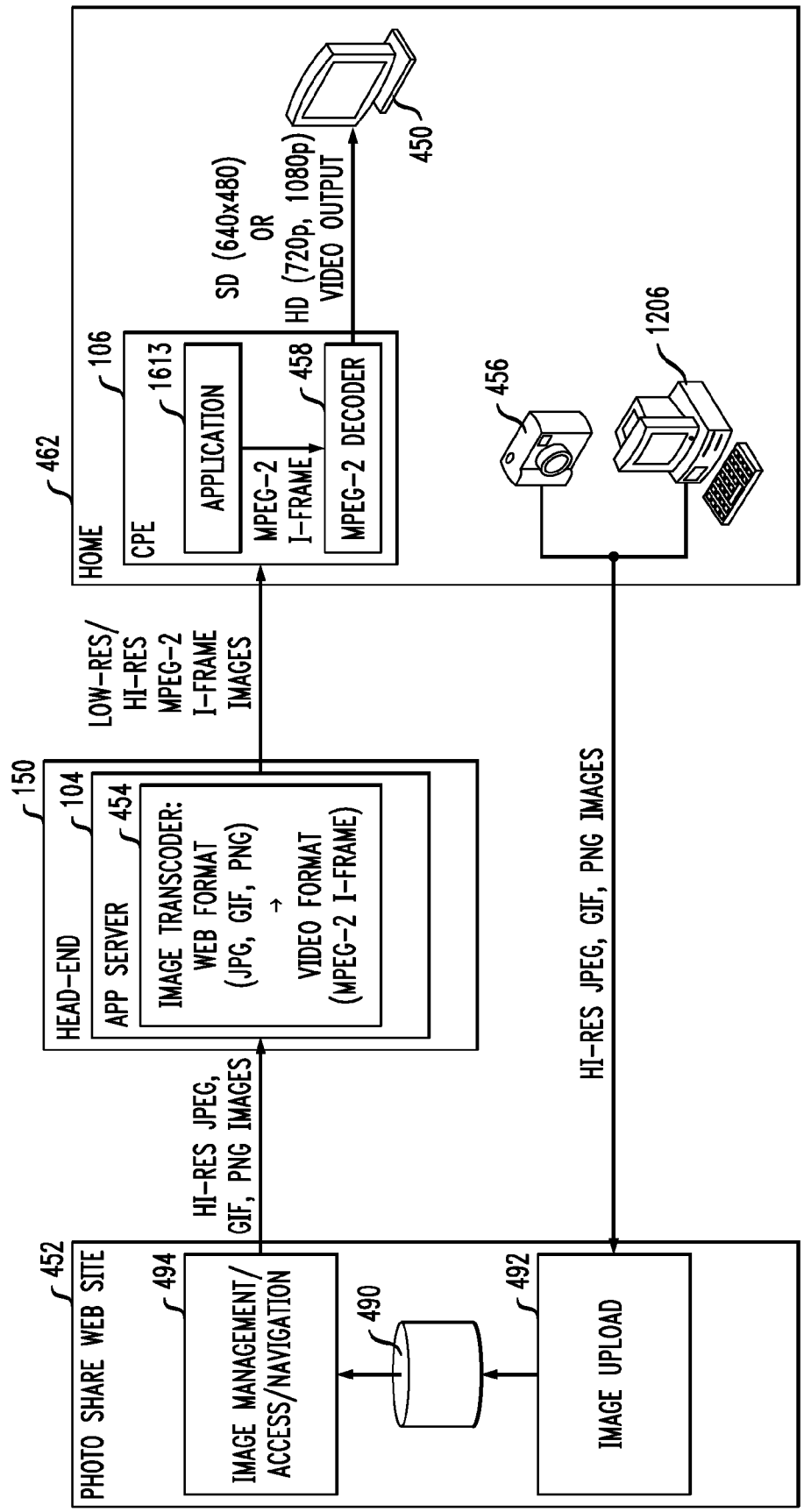
FIG. 4 is a functional block diagram of an exemplary embodiment of a video content network, according to an aspect of the invention.
Figure 5:
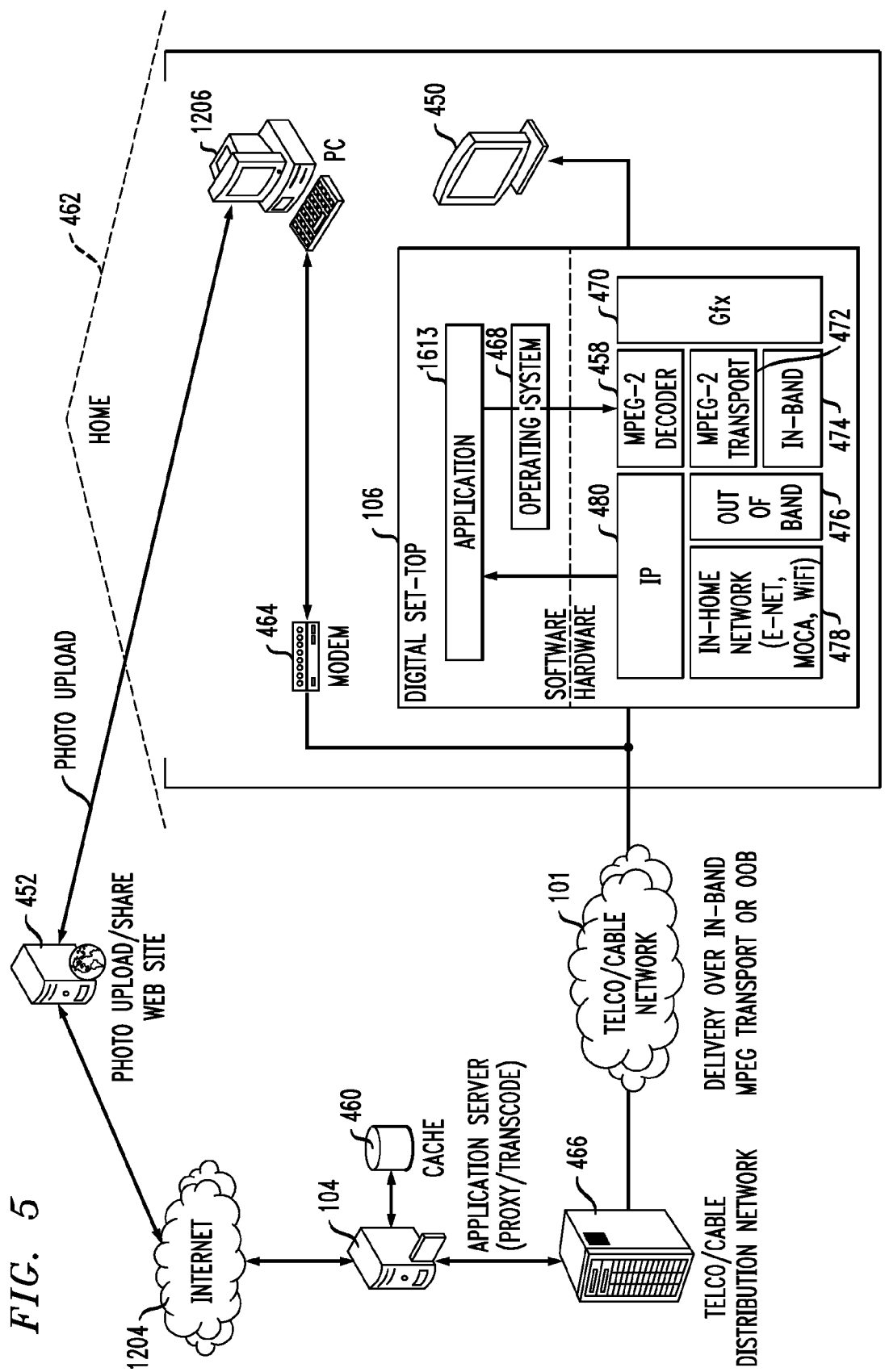
FIG. 5 is a more detailed view of the exemplary embodiment of FIG. 4.

With reference to FIGS. 4 and 5, exemplary photo-sharing techniques, according to one or more aspects of the invention, will now be described. In one or more embodiments, a content-based network, such as HFC network 101, is employed to download folders containing digital images to be shared, for display onto a television monitor 450 coupled to a terminal 106. Functionality can be provided such that users can view a slide show or navigate to different parts of an "album" containing the photos. In one embodiment, such functionality can be implemented by a client-side application 1613 cooperating with server 104, which communicates with a photo share web site 452 (reference character 452 is used herein to refer to both such photo share web site and a photo-sharing server hosting, or otherwise associated with, such web site). Photos are uploaded to web site 452, for example, from the PC 1206 of a user, over the Internet 1204. Application server 104 obtains photos from photo-sharing server 452, and normalizes the photos in transcoder 454 so they are easy to decode and render on the TV 450 coupled to terminal 106. Note that terminal 106 is depicted as a separate unit from television monitor 450, but in some instances, may be part of a single unit with a digital video recorder, television monitor, and/or similar hardware.

It will be appreciated that currently, high-resolution digital cameras 456 may have photos containing, say, six to seven megapixels. Such photos consume large amounts of memory, and memory may be limited on terminals 106. Accordingly, in an exemplary embodiment, pictures to be shared are stored in memory in head end 150 or a network node (for example, in memory on or accessible to servers 452, 104, such as memory 490 or cache 460), rather than in the memory of terminal 106. In a currently preferred approach, the pictures are stored in a web format, such as GIF, JPG, PNG, and the like, in memory 490 of server 452, and are fetched and transcoded into MPEG I-frames by application server 104 as needed and served to CPE 106 over network 101. In addition to avoiding the usage of scarce memory resources in terminal 106, this approach minimizes the burden on upstream data channels (as would be found if material to be shared was stored on a first user's terminal 106 and had to be transmitted upstream to reach another user's terminal 106).

Accordingly, in a preferred embodiment, components in server 452 handle image upload (block 492) as well as image management, access, and navigation (block 494), while a component in server 150 converts the digital photos to an MPEG still format (making use, for example, of transcoder 454) and sends the photos as MPEC stills down to the terminal 106 of the person desiring to access the shared photos. This person's terminal 106 decodes the MPEG stills using an MPEG decoder 458. Terminals 106 may have high or standard resolution capabilities and decode the still images accordingly. Note that terminals 106 may have, for example, 8 to 64 Meg memories, so it may be difficult to decode a full seven megapixel image. Embodiments of the invention overcome this by storing the digital images to be shared in head end 150 or another node (say, server 452). An additional benefit of this aspect of the invention, which may be realized in one or more embodiments, is that display time of the images on the terminals 106 is speeded up.

Photo sharing web site 452 may be implemented by a server contained in head end 150, or outside head end 150, but operatively coupled thereto, as shown in FIGS. 4 and 5. The server 452 may be configured to allow upload of digital photos thereto, for example, by allowing a user of a personal computer (PC) 1206 to access web site 452 and thus upload photos to the server of site 452 via the Internet 1204. The described functionality can be used with other types of head end and bearer network configurations; elements depicted in the figures are merely illustrative (by way of a non-limiting example, in some instances, a satellite network could be employed). In general, one or more of the following types of network are exemplary of those that can be used with one or more embodiments of the invention:

a cable television network (or other content network, for example, a telecommunications company video delivery network such as fiber to the home (FTTH), fiber to the curb (FTTC), or digital subscriber line (DSL)) (e.g., for network 101), and a wireless network such as a cellular network.

Note that the server of photo sharing web site 452 is not depicted in FIG. 2; as noted, it can be internal or external to head end 150. Where present in head end 150, it could be located, for example, on LAN 158 or 160; where external, it could be coupled, for example, to elements such as application server 104 via a wide area network (WAN), the Internet 1204, or the like.

As noted, digital images to be shared can be uploaded via Internet-connected PC 1206. In one or more embodiments, an MSO may operate web site 452, which subscribers may visit to upload pictures to the server thereof. As noted, such server can be in head end 150, or elsewhere. In a preferred but non-limiting embodiment, the MSO providing the photo-sharing service operates video-content network 101, and also provides Internet access to subscribers. Advantages of this type of arrangement include the ability for a subscriber to have a service where the Internet can be used to upload photos to be shared with friends, for example, on the same service provider's network, with a more integrated service allowing management of the subscriber's photos from the Internet with access via the set-top box.

The server of web site 452 may be a conventional web server. When a user of a terminal 106 wants to access, via his or her terminal 106, pictures which have been made available for sharing by another user, a component on application server 104 in head end 150 accesses the server of web site 452 (regardless of where the same is located) and downloads the pictures to the terminal 106 of the user who wishes to view them.

This can occur, for example, in response to application 1613 in terminal 106 contacting head end 150 via a reverse data channel (RDC). The aforementioned component on application server 104 in head end 150 accesses the server of web site 452 (the photos are stored in a memory in, or accessible to, the server of web site 452, and may be cached in cache 460 of application server 104 as needed). The component on the application server 104 makes the pictures available to terminal 106 over network 101. With regard to the aforementioned RDC, in a non-limiting example, upstream data from a set-top terminal 106 to head end 150 can be communicated via a reverse passband, e.g., a 5-40 MHz band, of a coaxial cable in network 101. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. It will be appreciated that a person skilled in the art may allocate other bandwidths for RDCs, depending on the actual implementation. A set-top terminal 106 utilizes an RDC for sending both application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously. As also specified by DAVIC, for communications purposes, the set-top terminals 106 and appropriate components in head end 150 are identified by the Internet protocol (IP) addresses assigned thereto. However, these IP addresses may be randomly assigned each time when system 100 is reconfigured. As a result, the IP address of a set-top terminal 106 or component in head end 150 may change after a system reconfiguration. Nevertheless, each set-top terminal 106 or component in head end 150 is also preferably assigned a media access control (MAC) address on a permanent basis, surviving any system reconfiguration.

One or more embodiments of the invention provide one or more advantages. For example, one or more embodiments of the invention require less bandwidth than prior art techniques, as in one or more embodiments of the invention, pictures to be shared are sent as MPEG stills (essentially, single I-frames), while in prior art techniques, a non-changing video (rather than a still) is sent as a video compliant with a VOD bit rate of 4 Mbps. Further, one or more embodiments of the invention allow incremental addition of photos to be shared, since only new photos in an album need to be uploaded to the server of photo sharing web site 452, while in certain prior art systems, even if it is only desired to add one additional photo, it is necessary to regenerate the entire video file (consisting of the photos in the album).

Thus, by way of review and provision of additional detail, a user within home 462 or other location uploads digital photos from his or her digital camera 456 to his or her PC 1206, which accesses web site 452, for example, over the Internet 1204. Such photos are stored on the server of web site 452 in formats such as high-resolution JPEG, GIF, PNG, and the like. Responsive to a request from terminal 106, application server 104 accesses the server of web site 452 over Internet 1204, obtains high-resolution JPEG, GIF, PNG, or similar images, and transcodes same to low or high resolution MPEG-2 I-frames using transcoder 454. These are then served to application 1613 in terminal 106, over network 101, decoded in block 458 and displayed on TV monitor 450. In FIG. 5, note modem 464, which may be, for example, a cable modem providing Internet access for PC 1206, and which may be provided and/or operated, for example, by the same MSO that operates network 101. Block 466 is representative of cable distribution functionality described above with respect to FIGS. 1 and 2. In addition to application 1613, software of terminal 106 can include operating system 468, while hardware components besides decoder 458 can include graphics block 470; MPEG-2 transport block 472; in-band and out-of-band interfaces 474, 476; in-home network functionality 478 (for example, Ethernet, Multimedia over Coax Alliance (MOCA), Wi-Fi wireless technology, and so on); and IP block 480.

Of course, it is to be appreciated that home 462 is representative of many different premises coupled to network 101, and photos uploaded from one home may be viewed by people in that home, or in another home or other premises.

A preferred but non-limiting manner of sending the photos from application server 104 to terminal 106 will now be described. In a two-way digital cable system, a low speed OOB (Out of Band) QPSK modem is used to communicate from the STB 106 with systems in the head end 150. As more and more two-way interactive applications are developed on digital set-top boxes, the low speed QPSK modem cannot satisfy the need for higher bandwidth. Hence an approach is developed that uses the OOB modem for low bandwidth upstream data, plus MPEG (data) transport on video frequencies for higher bandwidth downstream channels to the set-top box 106. This as metric channel can help to address the higher demand on the bandwidth from these new applications and/or services. Furthermore, this approach may afford bandwidth sharing between set-top boxes.

For most of the Internet television (ITV) applications, the bandwidth requirement is asymmetric. Most applications have enough upstream bandwidth available from the prevailing OOB channel, but require sending much larger data downstream at a much faster rate. Using an IP Gateway (IPGW) in the system achieves this goal by routing the downstream IP data away from the OOB connection and encapsulating the IP data into MPEG packets that are modulated in a quadrature amplitude modulation (QAM) format and sent to STB 106 over a video frequency as per ATSC specs. The QAM modulation for the MPEG packets provides much higher bandwidth than a QPSK OOB modem. An ITU-B QAM, when configured in 256QAM modulation mode, provides a 38.8 mbps bandwidth transport stream, while the QPSK modulation scheme only scales up to 1.5 Mbps.

Figure 6:
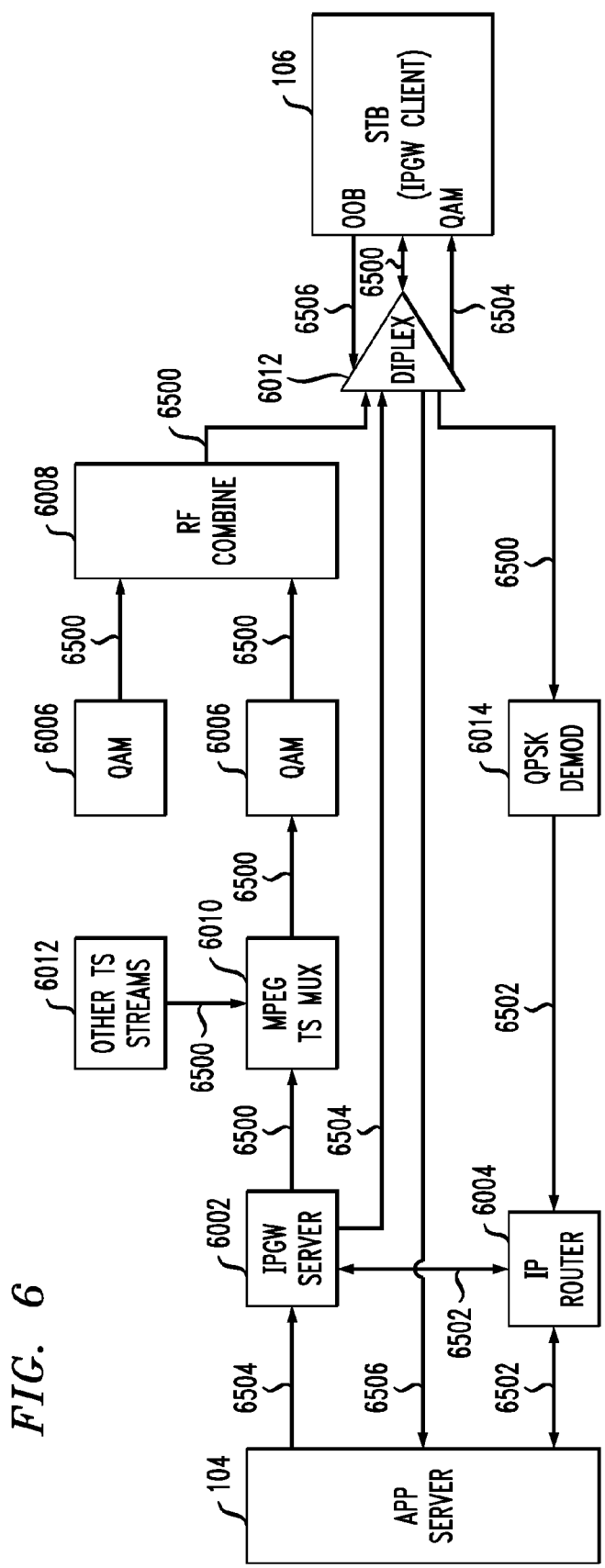
FIG. 6 is a functional block diagram showing an embodiment of an exemplary technique for in-band transport of still photos to a terminal in the exemplary network of FIGS. 4 and 5.

FIG. 6 shows an IP over MPEG end-to-end solution, which may be used for transport of pictures from application server 104 to terminal 106, in one or more embodiments of the invention. The system includes IPGW server 6002; an IPGW client (on terminal 106); network router 6004; QAMs 6006 interfacing with RF combiner 6008; diplexer 6012; and QPSK demodulator 6014. Optionally, MPEG transport stream (TS) multiplexer 6010 multiplexes in other streams 6012.

IPGW server 6002 is a device that intercepts IP data that is directed to STB 106 and encapsulates such IP data into MPEG private section data using DSM-CC Multi-protocol encapsulation (MPE). Data is transmitted to IPGW client on terminal 106 through an in-band QAM 6006.

IPGW client (terminal 106) is a device that receives downstream IP data encapsulated in an MPEG transport stream and sends the upstream IP data to servers 104 through an OOB return channel. IPGW-capable client devices do not need to add an additional tuner, since an existing digital video tuner can be used for downstream IP data, and an OOB QPSK tuner can be for upstream IP data.

Techniques for encapsulating the IP packets and transmitting same over an MPEG transport channel are known, and given the teachings herein, can be adapted by the skilled artisan to implement one or more embodiments of the invention.

In some IP over MPEG concepts, an STB 106 sets up a dedicated in-band MPEG session with IPGW server 6002 each time it tries to initiate a 2-way IP connection and a fixed bandwidth is reserved for each such session. In this approach, as each session is assigned a fixed bandwidth on a fixed frequency, a limited amount of sessions are allowed in each system, due to bandwidth limitations. Also, often a session times out due to inactivity from the STB or the user changes channels and re-tunes to other QAM frequencies. These cause sessions to be torn down and re-set up frequently. This session set up and teardown process involves message exchanges between STB 106 and IPGW server 6002 and the time to set up and tear down has some latency. This causes additional burdens on the system. Furthermore, when the user changes channels to a different frequency, there is a possibility that the session may not be granted, as the fixed BW sessions can exhaust the available BW on that particular QAM 6006.

Due to the burst nature of IP traffic from various interactive applications, a STB 106 can use little or no BW at times, while it can have a burst for using quite a lot of BW at other times. When using a dedicated IPGW session, each STB 106 is assigned a fixed BW. It wastes part of the bandwidth when it is not fully utilized and it cannot get more bandwidth than what has been assigned for the session when required during peak times. Moreover, sessions may waste significant amounts of BW, when they have an active session but are idle most of time. In summary, dedicated sessions may result in inefficient BW usage and/or support for only a limited number of sessions, since BW cannot be dynamically re-allocated among multiple sessions based on demand. Accordingly, in one or more embodiments of the inventions, IP over MPEG for transmission of photos is carried out by implementing shared session for IP data from multiple STBs. This may result in one or more of the following advantages:

1. Since new STBs can join the same session when 2-way communication is initiated, setup and teardown of a session is not required and hence setup time is much faster.
2. More efficient bandwidth usage, since STBs share the net bandwidth available and do not have to assign fixed bandwidth for each STB. This makes it possible for bandwidth to be available to other STBs when not utilized by some STBs. A virtually unlimited amount of IP "sessions" can be supported.

3. Since each STB does not need to set up a unique session, combining with channel tracking technology described below, a user can change channels without losing data during session teardown and setup.
4. Uses a more efficient HW filter to filter IP data, and consumes less CPU power.

Note that these advantages are exemplary and may not be present in every case; furthermore, some of these advantages may be more pertinent in contexts besides the viewing of digital photos.

Note, in one or more embodiments, with regard to FIG. 6, links labeled 6500 may be implemented via coax, while links labeled 6502 may be implemented by 100 Base-T (100 BT Fast Ethernet IEEE 802.3u). Arrows labeled 6504 represent IP downstream data flow while the arrows labeled 6506 represent IP upstream data flow.

Figure 7:
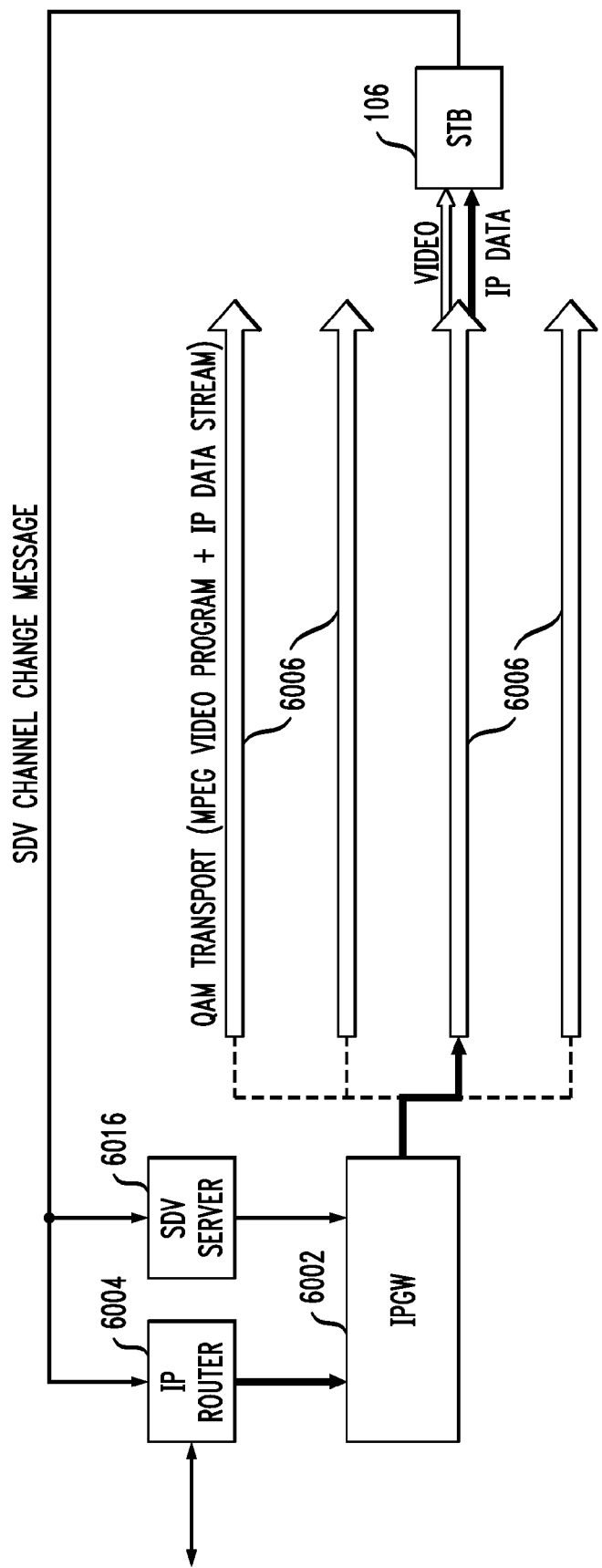
FIG. 7 depicts an optional detail of the system of FIG. 6.

Attention should now be given to FIG. 7, with regard to the aforementioned channel tracking using Switched Digital Video (SDV) technology. With SDV server 6016 in the system, every STB 106 on every channel change sends an upstream message to the system in the head end. The IPGW server 6002 can track the channel changes with the SDV messages from each STB 106 and hence can route the IP traffic to the MPEG transport on the same QAM frequency as the currently tuned video channel. One or more such implementations may have one or more of the following advantages:
1. Ability to track where the user is tuned to, hence can route the data to follow user channel changes. For the single tuner STB 106, the user can continue to watch a video program while continuing to receive data at the same time.
2. Utilize standard SDV protocol. No additional proprietary protocol is needed.

In view of the preceding discussion, it will be appreciated that, in general terms, an exemplary embodiment of a video content system, according to an aspect of the invention, includes a head end application server 104, and a photo-sharing server 452, coupled to the head end application server 104 (for example, over Internet 1204), and having an Internet interface (i.e., appropriate hardware and software to connect photo-sharing server 452 to Internet 1204, for purposes of receiving uploaded photos, and so on). A video content network 101 is coupled to the head end application server 104, and a terminal 106 is coupled to the video content network at a location remote from the head end application server 104 and the photo-sharing server 452 (many such terminals, in many locations, may of course be present). The photo-sharing server 452 is configured to accept upload of digital still images (for example, from PC 1206) via the Internet interface, and the digital still images are in a format other than MPEG I-frames. The head end application server 104 is configured to receive a request from the terminal 106 and, responsive to the request, to fetch the digital still images from the photo-sharing server 452, to transcode the digital still images into MPEG I-frames, and to make the MPEG I-frames available, over the video content network, for selective display via the terminal 106. Advantageously, the head end application server 104 is configured to make the MPEG I-frames available, over the video content network 101, for the selective display via the terminal 106, substantially without use of a video-on-demand server 105.

In some instances, a photo-sharing application 1613 is stored on the terminal 106, and the request from the terminal originates from the photo-sharing application. The terminal 106 can further include MPEG-2 decoder 458 and the photo-sharing application 1613 can be configured to display the MPEG I-frames as a slide show, and/or to permit a user to navigate the MPEG I-frames (this can be done, for example, in cooperation with application server 104 and/or photo sharing server 452, including block 494 thereof).

In one or more embodiments, advantageously, application 1613, the photo-sharing server 452 and the head end application server 104 are cooperatively configured to permit a person uploading the digital images to the photo-sharing server 452 to add individual additional images to already-uploaded images and are further cooperatively configured to accept the individual additional images in the format other than MPEG I-frames and to convert the individual additional images into the MPEG I-frames without having to re-convert the already-uploaded images. This is readily accomplished in the preferred embodiment as the photos are uploaded to memory 490 of server 452 and stored therein in the format other than MPEG I-frames (for example, a web format such as JPG, GIF, PNG, and the like) and are fetched as needed and transcoded to MPEG I-frames by application server 104 and then served to CPE 106 as needed; thus, additional individual pictures can be uploaded to memory 490 as desired without the need to take any action with regard to images already stored thereon.

In general, head end application server 104 and photo-sharing server 452 can be collocated in head end 150 of the video content network, or can be located remotely from each other.

In some instances, head end application server 104 is configured to make the MPEG I-frames available, over the video content network 101, for selective display via the terminal 106, via out-of-band communication over the video content network 101. In other embodiments, head end application server 104 is configured to make the MPEG I-frames available, over the video content network 101, for selective display via the terminal 106, via an Internet protocol over MPEG scheme, in-band over the video content network 101, as discussed elsewhere herein with respect to FIGS. 6 and 7. In such a case, many terminals such as terminal 106 communicate with the head end application server 104 via a shared session in the Internet protocol over MPEG scheme, over the video content network 101, as also described elsewhere herein with respect to FIGS. 6 and 7.

In some cases, a video content system is similar to the kind just described, but does not include the photo-sharing server 452; instead, such server is external to the system but the system is configured to remotely interface with it.

Figure 8:
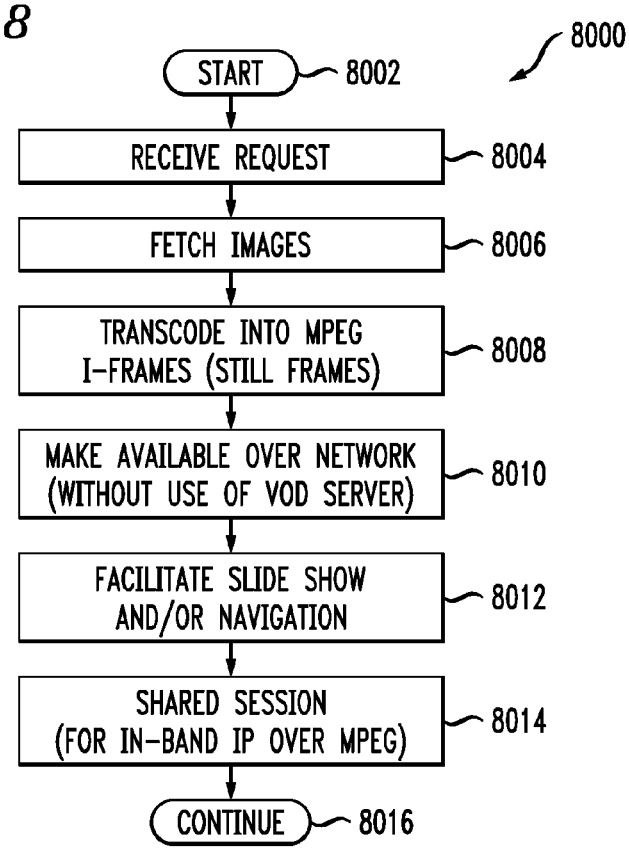
FIG. 8 is a flow chart of steps in an exemplary method, according to another aspect of the invention.

In another aspect, with reference now to FIG. 8, a method 8000 begins at block 8002 and includes the step 8004 of receiving, at a head end application server 104, a request from a remote terminal 106. The request is received over a video content network 101. Step 8006 includes fetching digital still images from a photo-sharing server 452. The digital still images are in a format other than MPEG I-frames. Step 8008 includes transcoding the digital still images into MPEG I-frames. Step 8010 includes, responsive to the request, making the MPEG I-frames available from the head end application server 104, over the video content network 101, for selective display via the terminal 106.

In one or more embodiments, the head end application server 104 makes the MPEG I-frames available, over the video content network 101, for selective display via the terminal 106, substantially without use of a video-on-demand server 105. In some instances, in receiving step 8004, the request from the remote terminal originates from a photo-sharing application 1613 on the terminal. Optional step 8012 includes facilitating display of the MPEG I-frames on the terminal 106 as a slide show, and/or facilitating navigation of the MPEG I-frames on the terminal 106. Step 8010 can be carried out by sending the MPEG I-frames via out-of-band communication over the video content network 101, or by sending the MPEG I-frames via an Internet protocol over MPEG scheme, in-band over the video content network 101, as per FIGS. 6 and 7, for example. In the latter case, an optional additional step 8014 includes facilitating a plurality of additional terminals 106 communicating with the head end application server 104 via a shared session in the Internet protocol over MPEG scheme, over the video content network. Processing continues at block 8016.

Thus, by way of review and provision of additional detail, in one or more embodiments, still photos may be uploaded to an internet site, the format of the still photos may be changed to MPEG frames, and made available on a set-top box and television via video in-band delivery or an out-of-band network, without use of VOD or video transcoding. Furthermore, in one or more embodiments, each still is kept as a separate photo, allowing additional photos to be easily added, and allowing easy preparation of slide shows and/or albums. Aspects of the invention address the manner in which photo images may be brought to set-top boxes in a video network.

The images can be obtained from any web site, whether within the MSO system or out of it. The photos are transported into MPEG I-frames (still frames), which are easy and fast to process on the set-top box and take less memory on the set-top box; then take the transcoded MPEG I-frames and bring them down to the box, where they produce a high-quality display on the television. As the user navigates, the photos are fetched from the server, using a client-server model. The server component will serve the images as the user navigates (as opposed to downloading all the images at once and storing them in the set-top box). In one or more instances, the images can be transferred over the video content network without using DOCSIS or Internet channels. In some instances, the images are sent using DAVIC out-of-band (OOB) techniques. In another aspect, in-band delivery can be employed, using, for example, using techniques from the aforementioned United States Patent Application Publication Number 2006/0130107 A1 of Gonder et al and as described with regard to FIGS. 6 and 7.

Referring back to FIG. 1, in one or more embodiments of the invention, VOD server(s) 105 are not employed (though they may be present in the overall system for their traditional functions). Rather, use is made of application server(s) 104. CPE 106 communicates with application server 104 and requests photos from a certain web site 452. Server 104 fetches the images in response and sends the images to the CPE 106 over network 101.

System and Article of Manufacture Details

Figure 9:
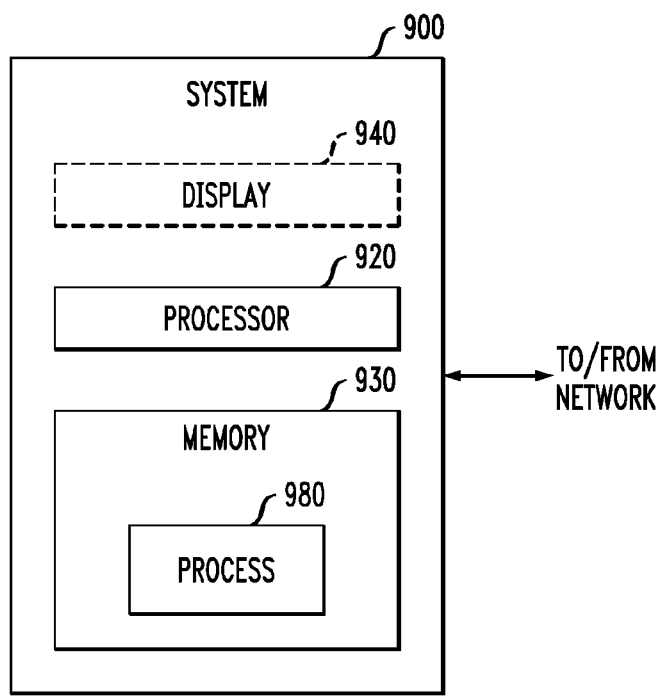
FIG. 9 is a block diagram of a computer system useful in connection with one or more aspects of the invention.

The invention can employ hardware and/or software aspects. Software includes but is not limited to firmware, resident software, microcode, etc. An exemplary embodiment of an inventive apparatus can include a memory and at least one processor coupled to the memory. The processor can be operative to facilitate performance of one or more of the method steps described herein. In another aspect, the apparatus can include means for performing the various method steps. The means can include one or more hardware modules, one or more software modules, or a mixture of one or more software modules and one or more hardware modules (appropriate interconnections via bus, network, and the like can also be included). One or more method steps of the present invention can be implemented in the form of an article of manufacture including a machine readable medium that contains one or more programs that when executed implement such step or steps. FIG. 9 is a block diagram of a system 900 that can implement part or all of one or more aspects or processes of the present invention, processor 920 of which is representative of processors (such as those in elements or blocks 102, 104, 105, 106, 150, 452, 1206, 170, 164, 6002, 6016) depicted in the other figures. In one or more embodiments, inventive steps are carried out by one or more of the processors in conjunction with one or more interconnecting network(s). As shown in FIG. 9, memory 930 configures the processor 920 to implement one or more aspects of the methods, steps, and functions disclosed herein (collectively, shown as process 980 in FIG. 9). The memory 930 could be distributed or local and the processor 920 could be distributed or singular. The memory 930 could be implemented as an electrical, magnetic or optical memory, or any combination of these or other types of storage devices. It should be noted that if distributed processors are employed, each distributed processor that makes up processor 920 generally contains its own addressable memory space. It should also be noted that some or all of computer system 900 can be incorporated into an application-specific or general-use integrated circuit. For example, one or more method steps could be implemented in hardware in an ASIC rather than using firmware. Display 940 is representative of a variety of possible input/output devices.

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

Accordingly, it will be appreciated that one or more embodiments of the present invention can include a computer program including computer program code means adapted to perform one or all of the steps of any methods or claims set forth herein when such program is run on a computer, and that such program may be embodied on a computer readable medium. Further, one or more embodiments of the present invention can include a computer including code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A video content system comprising:
   a photo-sharing server having an Internet interface, said photo-sharing server comprising a first processor and a first memory;
   a head end application server coupled to said photo-sharing server, said head end application server comprising a second processor and a second memory;
   a video content network coupled to said head end application server; and
   a terminal coupled to said video content network at a location remote from said head end application server and said photo-sharing server; wherein:
   said first processor of said photo-sharing server is configured to accept upload of individual digital still images via said Internet interface, said individual digital still images being in a format other than MPEG I-frames; and
   said second processor of said head end application server is configured to receive a request from said terminal and, responsive to said request, to fetch said individual digital still images from said photo-sharing server comprising said first processor, to transcode said individual digital still images into individual MPEG I-frames without use of video transcoding, and to make said individual MPEG I-frames available, over said video content network, for selective display via said terminal;
   further comprising a video-on-demand server which makes videos available on demand at said terminal over said video content network, wherein said head end application server is configured to make said individual MPEG I-frames available, over said video content network, for said selective display via said terminal, without use of said video-on-demand server;
   wherein said photo-sharing server and said head end application server are cooperatively configured to permit a person uploading said individual digital still images to said photo-sharing server to add individual additional images to already-uploaded images and are further cooperatively configured to accept said individual additional images in said format other than MPEG I-frames and to convert said individual additional images into additional individual MPEG I-frames without having to re-convert said already-uploaded images.

2. The video content system of claim 1, further comprising a photo-sharing application stored on said terminal, wherein said request from said terminal originates from said photo-sharing application.

3. The system of claim 2, wherein said terminal further comprises an MPEG-2 decoder and wherein said photo-sharing application is configured to display said individual MPEG I-frames as a slide show.

4. The system of claim 3, wherein said photo-sharing application is configured to permit a user to navigate said individual MPEG I-frames.

5. The system of claim 1, wherein said head end application server and said photo-sharing server are collocated in a head end of said video content network, and wherein said terminal is located remotely from said head end of said video content network.

6. The system of claim 1, wherein said head end application server and said video-on-demand server are collocated in a head end of said video content network, and wherein said photo-sharing server is located remotely from said head end of said video content network.

7. The system of claim 1, wherein said head end application server is configured to make said individual MPEG I-frames available, over said video content network, for selective display via said terminal, via out-of-band communication over said video content network.

8. The system of claim 1, wherein said head end application server is configured to make said individual MPEG I-frames available, over said video content network, for selective display via said terminal, via an Internet protocol over MPEG scheme, in-band over said video content network.

9. The system of claim 8, further comprising a plurality of additional terminals, wherein said terminals communicate with said head end application server via a shared session in said Internet protocol over MPEG scheme, over said video content network.

10. A video content system configured to interface with an external photo-sharing server comprising a first processor coupled to a first memory having stored thereon individual digital still images in a format other than MPEG I-frames, said system comprising:
   a head end application server comprising a second processor coupled to a second memory and configured to be coupled to the external photo-sharing server;
   a video content network coupled to said head end application server; and
   a terminal coupled to said video content network at a location remote from said head end application server;
   wherein said second processor of said head end application server is configured to:
      receive a request from said terminal and,
      responsive to said request:
         to fetch the individual digital still images from said photo-sharing server comprising said first processor,
         to transcode said individual digital still images into individual MPEG I-frames without use of video transcoding, and
         to make said individual MPEG I-frames available, over said video content network, for selective display via said terminal;
   further comprising a video-on-demand server which makes videos available on demand at said terminal over said video content network, wherein said head end application server is configured to make said individual MPEG I-frames available, over said video content network, for said selective display via said terminal, without use of said video-on-demand server;

wherein the external photo-sharing server and said head end application server are cooperatively configured to permit a person uploading said individual digital still images to the external photo-sharing server to add individual additional images to already-uploaded images and are further cooperatively configured to accept said individual additional images in said format other than MPEG I-frames and to convert said individual additional images into additional individual MPEG I-frames without having to re-convert said already-uploaded images.

11. The system of claim 10, wherein said head end application server is configured to make said individual MPEG I-frames available, over said video content network, for selective display via said terminal, via out-of-band communication over said video content network.

12. The system of claim 10, wherein said head end application server is configured to make said individual MPEG I-frames available, over said video content network, for selective display via said terminal, via an Internet protocol over MPEG scheme, in-band over said video content network.

13. A method comprising the steps of:
receiving, at a head end application server comprising a first processor coupled to a first memory, a request from a remote terminal, said request being received over a video content network;
fetching individual digital still images from a photo-sharing server comprising a second processor coupled to a second memory, said individual digital still images being in a format other than MPEG I-frames;
transcoding said individual digital still images into individual MPEG I-frames without use of video transcoding; and
responsive to said request, making said individual MPEG I-frames available from said head end application server, over said video content network, for selective display via said terminal;
further comprising the additional steps of:
making videos on a video-on-demand server available on demand at said terminal over said video content network, wherein said head end application server makes said individual MPEG I-frames available, over said video content network, for selective display via said terminal, without use of said video-on-demand server;
permitting a person uploading said individual digital still images to said photo-sharing server to add individual additional images to already-uploaded images; and
accepting said individual additional images in said format other than MPEG I-frames and to converting said individual additional images into additional individual MPEG I-frames without having to re-convert said already-uploaded images.

14. The method of claim 13, wherein, in said receiving step, said request from said remote terminal originates from a photo-sharing application on said terminal.

15. The method of claim 14, further comprising the additional step of facilitating display of said individual MPEG I-frames on said terminal as a slide show.

16. The method of claim 14, further comprising the additional step of facilitating navigation of said individual MPEG I-frames on said terminal.

17. The method of claim 13, wherein said step of making said individual MPEG I-frames available, over said video content network, for selective display via said terminal, comprises sending said individual MPEG I-frames via out-of-band communication over said video content network.

18. The method of claim 13, wherein said step of making said individual MPEG I-frames available, over said video content network, for selective display via said terminal, comprises sending said individual MPEG I-frames via an Internet protocol over MPEG scheme, in-band over said video content network.

19. The method of claim 18 further comprising the additional step of facilitating a plurality of additional terminals communicating with said head end application server via a shared session in said Internet protocol over MPEG scheme, over said video content network.

20. A system comprising:
means for receiving, at a head end application server comprising a first processor and a first memory, a request from a remote terminal, said request being received over a video content network;
means for fetching individual digital still images from a photo-sharing server comprising a second processor and a second memory, said individual digital still images being in a format other than MPEG I-frames;
means for transcoding said individual digital still images into individual MPEG I-frames without use of video transcoding; and
means for, responsive to said request, making said individual MPEG I-frames available, from said head end application server, over said video content network, for selective display via said terminal;
further comprising:
means for making videos on a video-on-demand server available on demand at said terminal over said video content network, wherein said means for making said individual MPEG I-frames available, over said video content network, for selective display via said terminal, avoid use of said video-on-demand server;
means for making videos on a video-on-demand server available on demand at said terminal over said video content network, wherein said head end application server makes said individual MPEG I-frames available, over said video content network, for selective display via said terminal, without use of said video-on-demand server;
means for permitting a person uploading said individual digital still images to said photo-sharing server to add individual additional images to already-uploaded images; and
means for accepting said individual additional images in said format other than MPEG I-frames and to converting said individual additional images into additional individual MPEG I-frames without having to re-convert said already-uploaded images.

21. The system of claim 20, wherein said means for making said individual MPEG I-frames available, over said video content network, for selective display via said terminal, comprise means for sending said individual MPEG I-frames via out-of-band communication over said video content network.

22. The system of claim 20, wherein said means for making said individual MPEG I-frames available, over said video content network, for selective display via said terminal, comprise means for sending said individual MPEG I-frames via an Internet protocol over MPEG scheme, in-band over said video content network.

* * * * *